(12) United States Patent
Ikeda et al.

(10) Patent No.: US 6,474,682 B2
(45) Date of Patent: Nov. 5, 2002

(54) STEERING WHEEL WITH AN AIRBAG DEVICE

(75) Inventors: Takanobu Ikeda; Akio Hosoi, both of Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 09/773,633

(22) Filed: Feb. 2, 2001

(65) Prior Publication Data

US 2001/0011815 A1 Aug. 9, 2001

(30) Foreign Application Priority Data

Feb. 3, 2000 (JP) .......................................... 2000-026832

(51) Int. Cl.[7] .......................... B60R 21/22; B60R 21/20
(52) U.S. Cl. .................. 280/731; 280/728.2; 200/61.55; 403/322.4
(58) Field of Search .............................. 280/731, 728.2; 200/61.54, 61.55; 403/322.4, 292, 329, 360, 375, 321, 322.1, 324–330

(56) References Cited

U.S. PATENT DOCUMENTS

| | | | | |
|---|---|---|---|---|
| 5,046,757 A | * | 9/1991 | Sadler et al. ............... | 280/731 |
| 5,087,069 A | * | 2/1992 | Corbett et al. ............... | 280/731 |
| 5,380,037 A | * | 1/1995 | Worrell et al. ............ | 200/61.55 |
| 5,508,481 A | * | 4/1996 | Williams et al. ......... | 200/61.54 |
| 5,630,611 A | * | 5/1997 | Goss et al. ............... | 280/728.2 |
| 5,636,858 A | * | 6/1997 | Niederman et al. ...... | 280/728.2 |
| 5,775,725 A | * | 7/1998 | Hodac et al. ............. | 280/728.2 |
| 5,785,286 A | * | 7/1998 | Hiesinger et al. ........ | 248/187.1 |
| 5,855,449 A | * | 1/1999 | Thomas ...................... | 403/262 |
| 6,149,188 A | * | 11/2000 | Simpson et al. ............ | 280/731 |
| 6,237,944 B1 | * | 5/2001 | Worrell et al. ........... | 280/728.2 |
| 6,276,711 B1 | * | 8/2001 | Kurz et al. ............... | 280/728.2 |

FOREIGN PATENT DOCUMENTS

| | | | |
|---|---|---|---|
| DE | 299 08 967 U1 | * | 12/1999 |
| JP | 11-011247 | | 1/1999 |

\* cited by examiner

Primary Examiner—Paul N. Dickson
Assistant Examiner—Ruth Ilan
(74) Attorney, Agent, or Firm—Pillsbury Winthrop LLP

(57) ABSTRACT

Connecting pins are provided at connecting portions on the airbag device side in such a manner as to project therefrom, whereas connecting parts adapted to rotate in directions normal to an axial direction of the connecting pins are disposed on the main body side. The hook portions of the connecting parts interfere with a guide surfaces of the connecting pins which are forced in along the axial direction thereof to thereby be disposed at waiting positions where the hook portions can rotate in the lock releasing direction.

8 Claims, 11 Drawing Sheets

FIG. 4

STEERING WHEEL WITH AN AIRBAG DEVICE

BACKGROUND OF THE INVENTION

1. Field of the Invention

The present invention relates to a steering wheel with an air bag device, and more particularly to a steering wheel in which an airbag device can be attached thereto and detached therefrom in a simple fashion.

The present application is based on Japanese Patent Application No. 2000-26832, which is incorporated herein by reference.

2. Description of the Related Art

In a conventional steering wheel with an airbag device, as disclosed in SP-A-11-11247, an airbag device is attached to a core plate on a steering wheel main body at left and right sides thereof with bolts.

As described above, however, in attaching the airbag device to the steering wheel main body by rotationally tightening the bolts, the tightening torque needs to be controlled, and since a plurality of bolts are used, labor hours are needed not only for attachment but also for detachment of the airbag device.

Furthermore, an operation hole needs to be provided in the steering wheel main body for inserting a tool such as a screw driver for use in tightening or loosening the bolts, and conventionally such operation holes are opened in lateral sides of a lower cover disposed at a lower portion of the steering wheel main body, this deteriorating the external appearance of the lower cover.

SUMMARY OF THE INVENTION

The invention was made with a view to solving the above problems, and an object thereof is to provide a steering wheel with an air bag device in which the deterioration in external appearance thereof can be suppressed and in which an air bag device can be attached thereto and detached therefrom in a simple fashion.

According to the invention, there is provided a steering wheel with an airbag device in which the airbag device is mounted on a steering wheel main body at a plurality of connecting points, the steering wheel with an airbag device being characterized in that connecting pins are provided on one of the steering wheel main body and the airbag device at the respective connecting points in such a manner as to protrude toward the other, and connecting levers are disposed on the other of the steering wheel main body and the airbag device in such a manner as to rotate in a direction substantially normal to an axial direction of the connecting pin, that the connecting pins are each constituted by a locking portion disposed at a distal end of the pin and having a tapered and inclined guide surface and a small diameter portion disposed at a proximal end thereof and having a diameter which is smaller than that of a proximal end of said locking portion, that the connecting pins each comprise a hook portion adapted to be inserted in the small diameter portion of the locking pin for locking a proximal portion of the locking portion and an operating portion for operating the hook portion so as to rotate in a lock releasing direction and is biased in a locking direction, and that the hook portion interferes, when connected, with the guide surface of the connecting pin which is being forced in the axial direction of the connecting pin so as to be located at a waiting position where the hook portion is allowed to rotate in the lock releasing direction.

Then, it is desirable to create a large diameter portion, having an larger outside diameter than the outside diameter of said locking portion, at the distal end of the connecting pins. Further it is desirable that fitting holes for allowing the large diameter portions to fit therein when the distal portions of the locking portions are locked by the hook portions are disposed in the other side of the steering wheel main body and the airbag device where the connecting levers are disposed.

In addition, it is desirable to dispose springs on the side of the steering wheel main body and the airbag device where the connecting pins are disposed. These springs are adapted to be brought into abutment with the other of the steering main body and the airbag device where the connecting levers are disposed and to bias the connecting pins respectively along the axial direction of the connecting pins and in a direction in which the connecting pins move away from the hook portions.

In the steering wheel according to the invention, when the airbag device is mounted on the steering wheel main body, the connecting pins are forced into the side where the connecting levers are disposed.

Then, the hook portions of the connecting levers interfere with the guide surfaces of the connecting pins which are forced in along the axial direction thereof to thereby be located at the waiting positions where the hook portions can rotate in the lock releasing direction, whereby as the connecting pins are forced in, the hook portions rotate in the lock releasing direction while being guided along the guide surfaces. Then, when the small diameter portions come to be disposed at the positions of the hook portions, the hook portions are inserted into the small diameter portions by the biasing means to thereby lock the distal portions of the locking portions such that the connecting pins cannot be dislocated. As a result, the air bag device comes to be mounted on the steering wheel main body.

Namely, when mounting the air bag device on the steering wheel main body, the connecting pins only have to be forced into the side where the connecting levers are disposed, as a result of which the air bag device is mounted on the steering main body in a simple fashion.

Thereafter, when dismounting the air bag device from the steering wheel main body, a tool such as a pin is hooked on the operating portion of the connecting lever so as to rotate the connecting lever in the lock releasing direction in which the hook portion is released from the locking state, then the air bag device is moved such that the connecting pins are pulled out of the hook portions. As a result the air bag device can be dismounted from the steering wheel main body.

Additionally, the tool used to rotate the connecting lever may be such that it simply hooks on to the operating portion of the connecting lever so as to slightly rotate the connecting lever, and such an operation can be effected from the bottom face side of a lower cover and the like of the steering wheel main body. Therefore, even if operational holes are to be provided, the operation holes can be opened not in the top or the side face but in the bottom face of the steering wheel main body. Consequently, the external appearance of the steering wheel is not deteriorated. Of course, even if the operation holes are opened in a side face of the steering wheel main body, these operating holes are smaller in diameter than the operation holes for the tool such as a screw driver may be opened, since the tool for rotating the connecting lever is such that the tool simply hooks on to the operating portion so as to slightly rotate the connecting lever, namely the tool may comprise a pin of a thin wire material or the like. As a result, the deterioration in external appearance of the steering wheel can be suppressed to an extreme extent.

Accordingly, with the steering wheel according to the invention, while suppressing the deterioration in external appearance of the steering wheel, the air bag device can simply be mounted on and dismounted from the steering wheel main body.

Then, the large diameter portion having the larger diameter than the locking portion is provided at the distal portion of the connecting pin, and the fitting holes are formed in the side where the connecting levers are disposed in order to allow the large diameter portions to be inserted thereinto when the distal portions of the locking portions are locked by the hook portions. According to this construction, when the air bag device is mounted on the steering wheel main body (when the distal portions of the locking portions of the connecting pins are locked by the hook portions of the connecting levers), the large diameter portions of the connecting pins are allowed to fit in the fitting holes, whereby the movements of the connecting pins in directions normal to the axes thereof are restricted, to thereby make it possible to prevent the loosening of the connecting pins in the directions normal to the axes thereof in the air bag device.

Additionally, the disposition of the springs on the side where the connecting pins are disposed, such that these springs are adapted to be brought into abutment with the side where the connecting levers are disposed and to bias the connecting pins respectively along the axial direction of the connecting pins and in the direction in which the connecting pins move away from the hook portions, can provide the following operations and advantages.

Namely, when the air bag device is mounted on the steering wheel main body (when the distal portions of the locking portions of the connecting pins are locked by the hook portions of the connecting levers), the connecting pins are biased respectively along the axial direction thereof and in the direction in which the connecting pins move away from the hook portions by the biasing force of the springs so that the hook portions of the connecting levers are brought into abutment more securely with the distal portions of the locking portions of the connecting pins. Therefore, the distal portions of the locking portions are locked by the hook portions, so that the movement of the connecting pins in the direction in which they move away from the hook portion is restricted. On the contrary, the movement of the connecting pins in a direction in which the connecting pins are forced into the hook portions is restricted by the biasing force of the springs. As a result, when the air bag device is mounted on the steering wheel main body (when the distal portions of the locking portions of the connecting pins are locked by the hook portions of the connecting levers), the movement of the connecting pins in the axial direction thereof is restricted, to thereby make it possible to prevent the loosening of the connecting pins in the axial direction thereof in the air bag device.

Additionally, when the air bag device is mounted on the steering wheel main body (when the distal portions of the looking portions of the connecting pins are locked by the hook portions of the connecting levers), since the connecting pins are biased respectively along the axial direction thereof and in the direction in which the connecting pins move away from the hook portions by the biasing force of the springs, in the event that the tool hooks on to the operating portion so as to rotate the connecting lever to thereby release the hook portion from the locking state, the connecting pin is easily released from the hook portion by the biasing force of the spring, and thereafter, even if the tool is removed from the operating portion so that the connecting lever is biased to be restored to its original position, the locking portion of the connecting pin keeps released from the hook portion, consequently, the air bag device can be easily dismounted from the steering wheel main body without the interference of the connecting pins with the connecting levers.

BRIEF DESCRIPTION OF THE DRAWINGS

FIG. 4 is a vertical sectional view of the steering wheel according to the embodiment taken at a portion along the line IV—IV in FIG. 1;

DETAILED DESCRIPTION OF THE PREFERRED EMBODIMENTS

Figure 1:
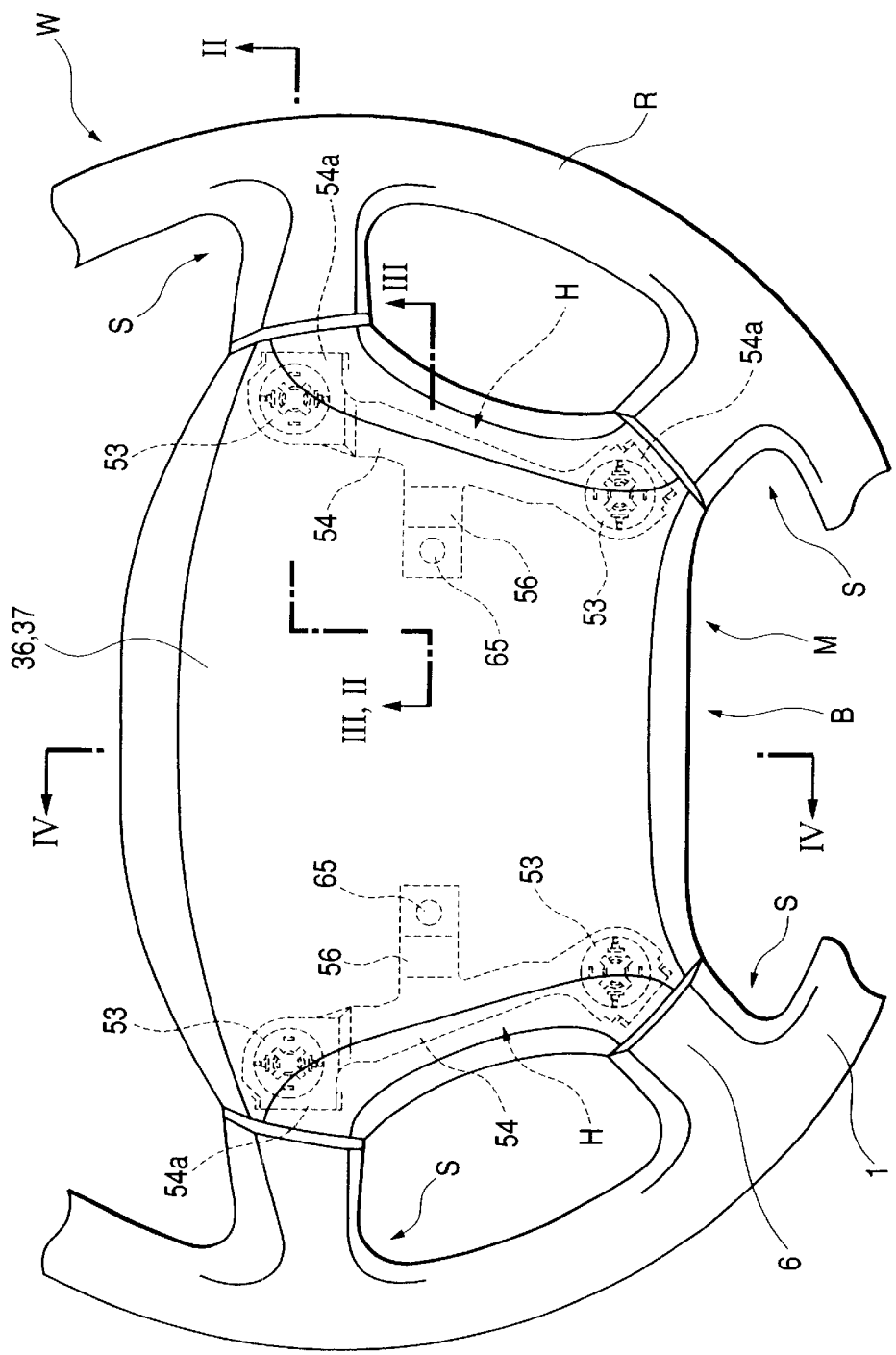
FIG. 1 is a plan view of a steering wheel according to an embodiment of the invention.

Referring to the accompanying drawings, one embodiment of the invention will be described below.

As shown in FIGS. 1 to 4, a steering wheel W according to the embodiment of the invention comprises a steering wheel main body 1 and an air bag device M disposed at an upper portion of a boss portion B at the center of the steering wheel main body 1.

As shown in FIGS. 1 to 5, the steering wheel main body 1 is constituted by a circular ring portion R which is gripped when steering the vehicle, the boss portion B disposed at the center of the ring portion R and four spoke portions S for connecting the boss portion B and the ring portion R. The four spoke portions S are arranged such that two upper and lower spoke portions are disposed on each side of the boss portion. Furthermore, the steering wheel main body 1 comprises a core plate 2 disposed so as to connect the ring portion R, the boss portion B and the spoke portions S together. A ring portion core bar 3 (refer to FIG. 2) and respective spoke portion core plates 5 on a ring portion core bar 3 side are covered with a synthetic resin cover layer 6. A core plate 4 at the boss portion B is constituted by a steel boss 4a connected to a steering shaft, not shown, and a cover portion 4b of an aluminum alloy or the like integrally formed with the spoke portion core plates 5 so as to cover around the boss 4a. The ring portion core bar 3 is formed of a steel pipe, which is partially covered with the spoke portion core plates 5, whereby the core bar 3 is connected to the spoke portion core plates 5.

Figure 2:
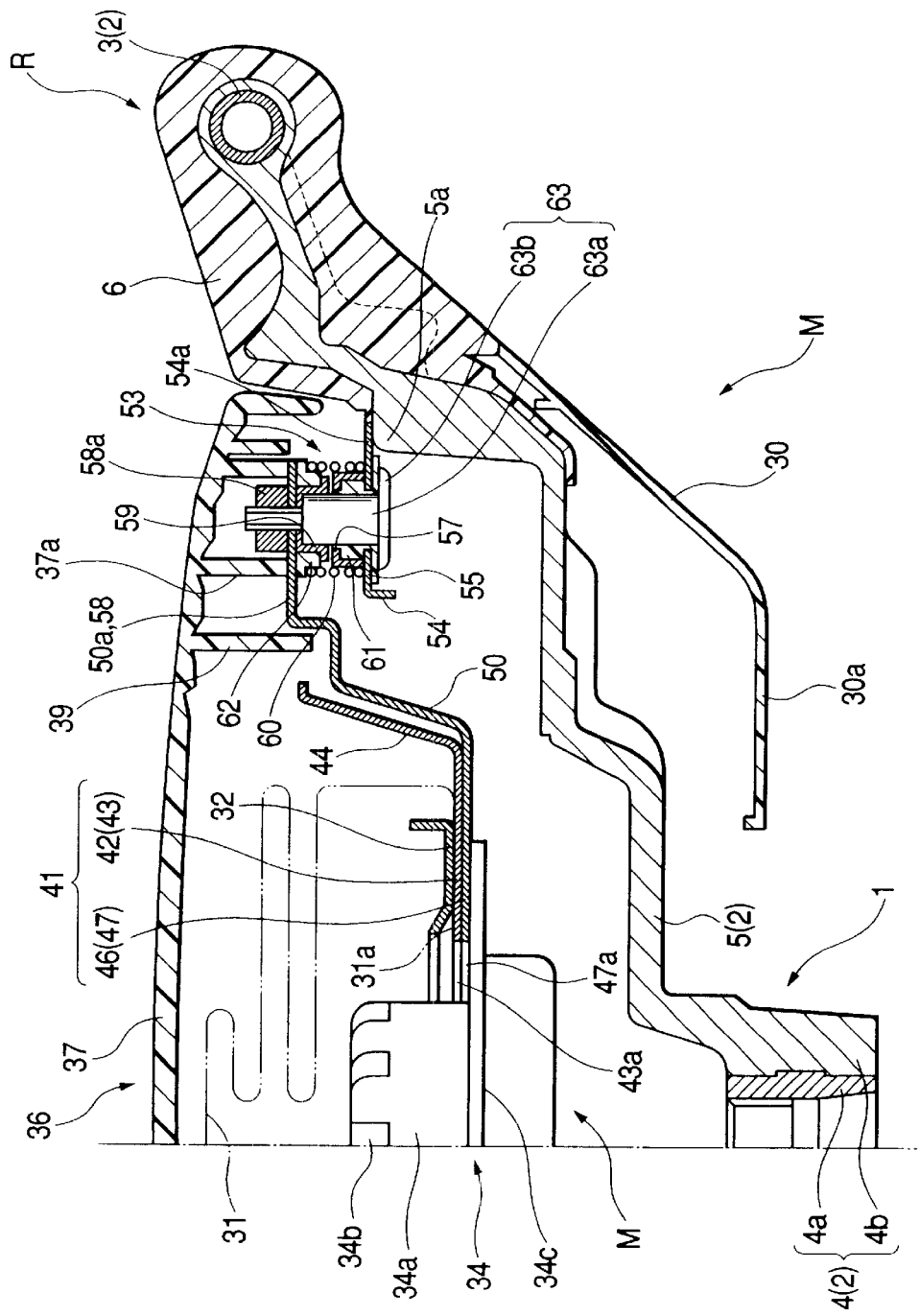
FIG. 2 is a vertical sectional view of the steering wheel according to the embodiment taken at a portion along the line II—II in FIG. 1.
Figure 5:
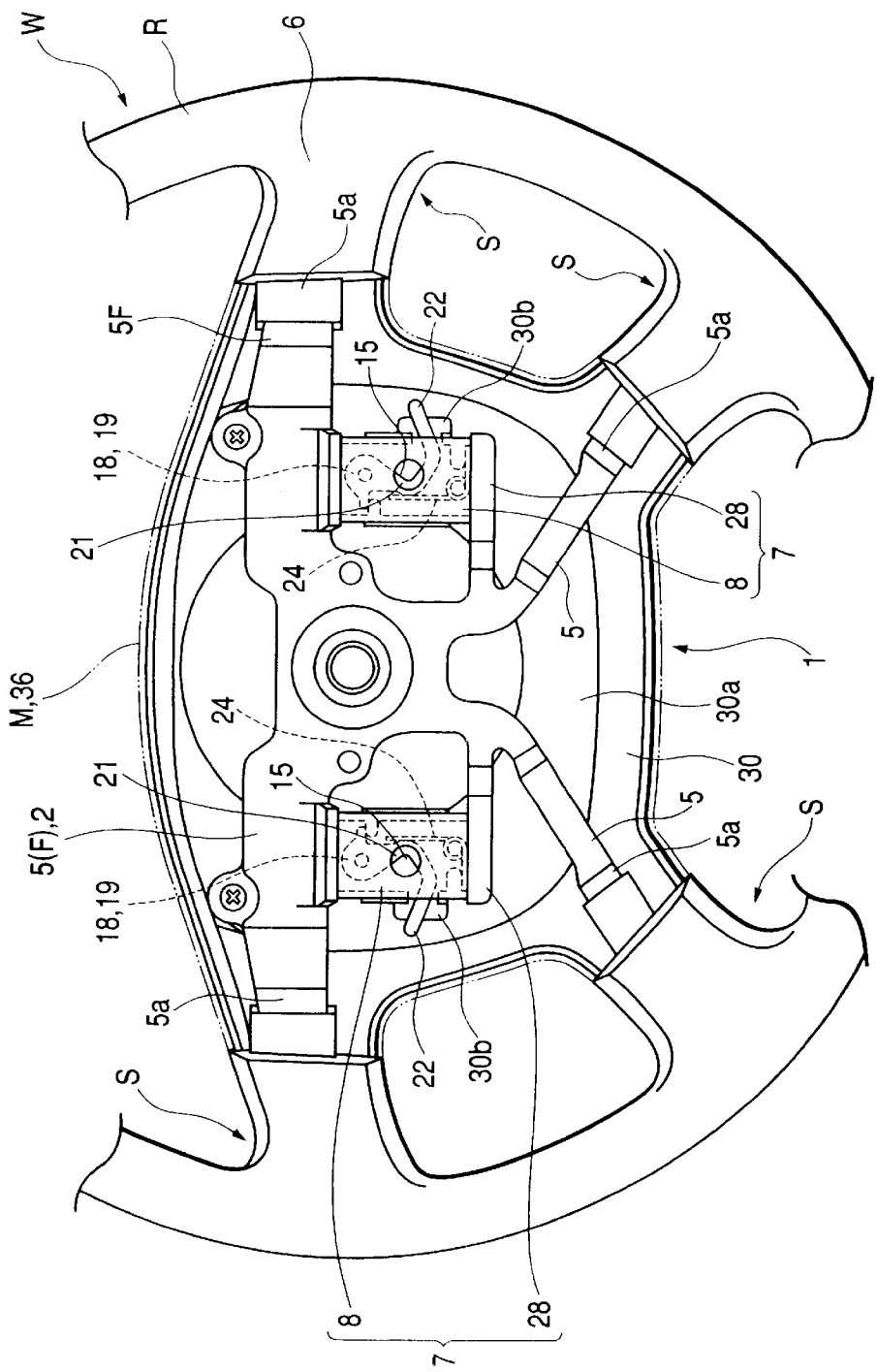
FIG. 5 is a plan view of a steering wheel main body according to the embodiment.
Figure 6:
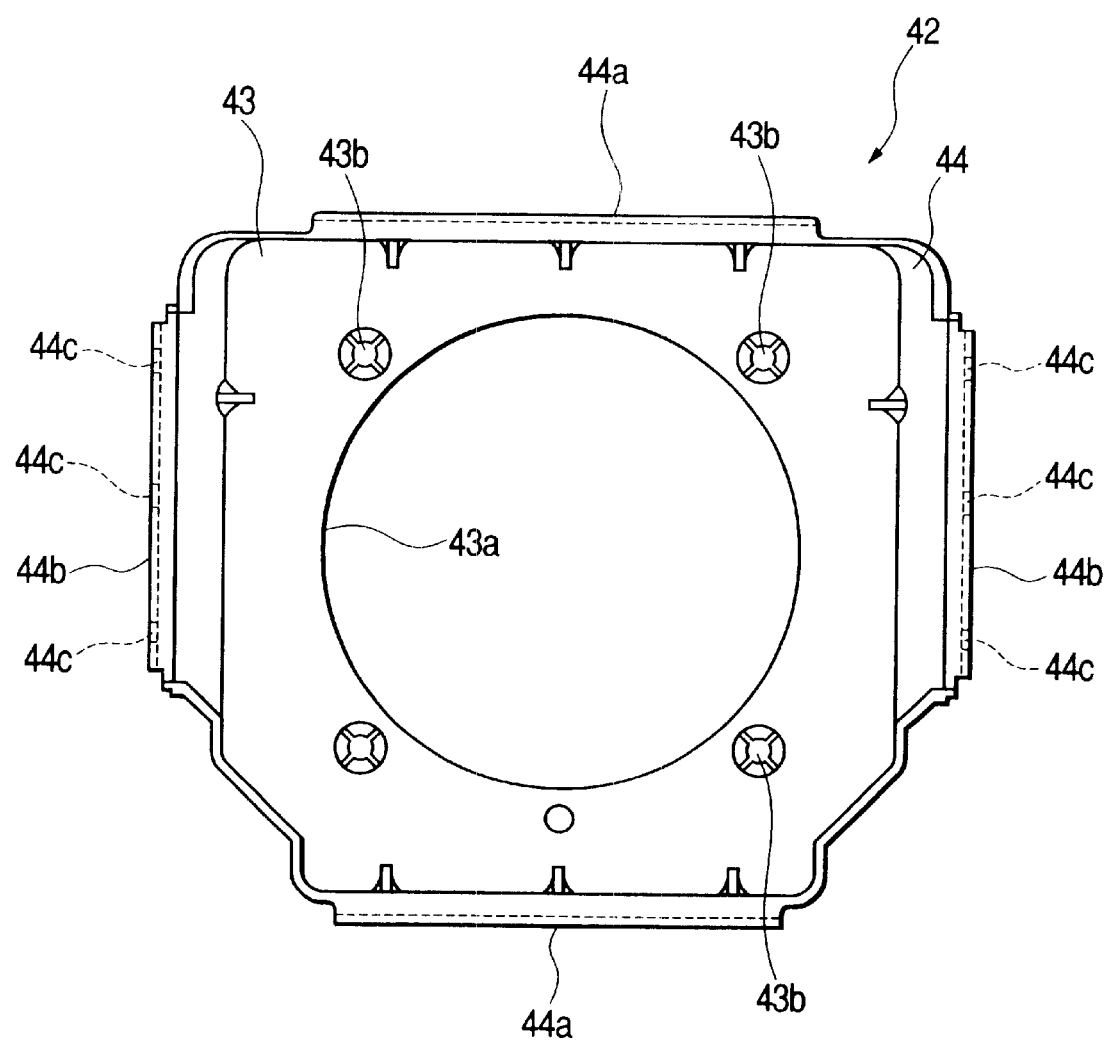
FIG. 6 is a plan view of a holder plate for use in an air bag device according to the embodiment.
Figure 7:
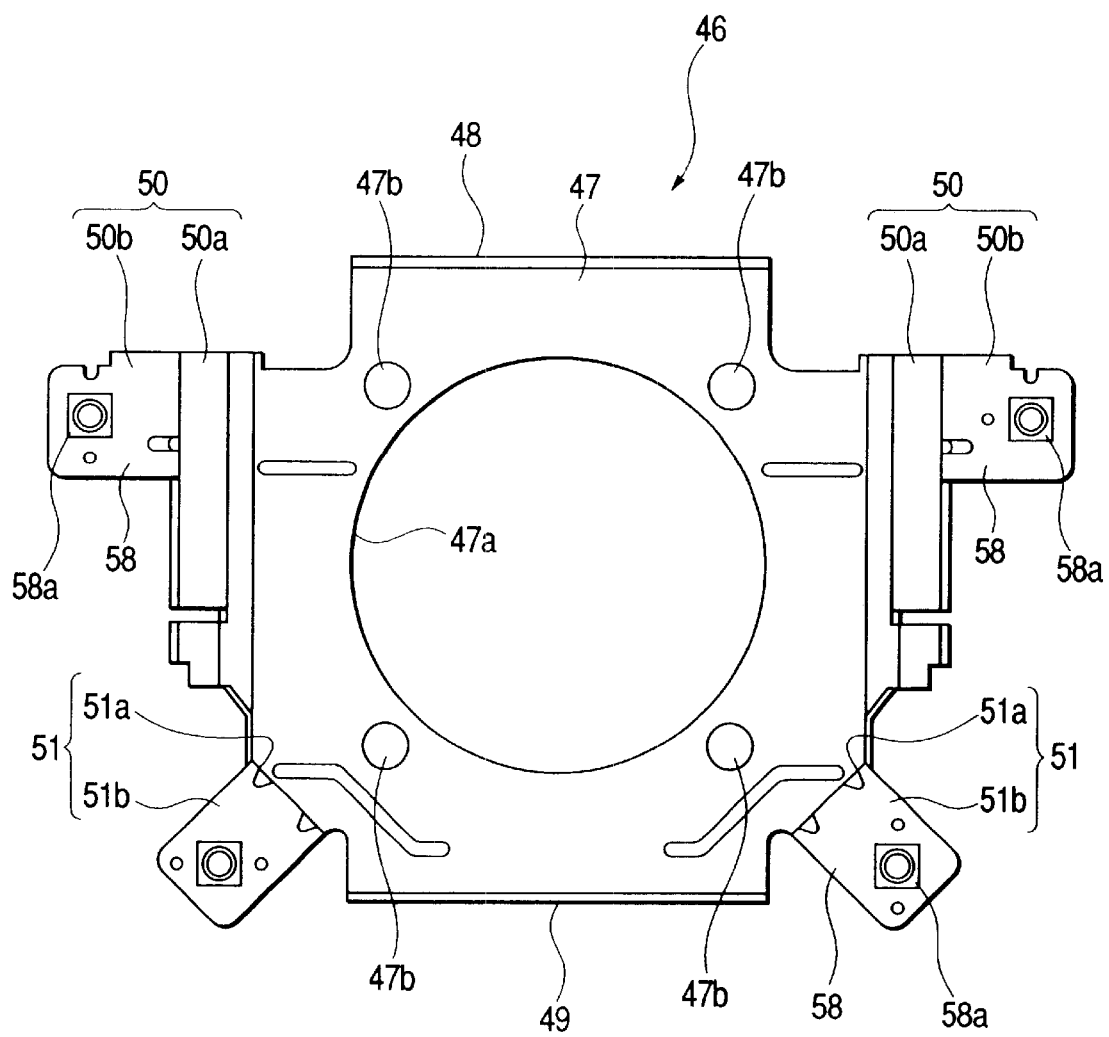
FIG. 7 is a plan view of a back-up plate for use in an air bag device according to the embodiment.

As shown in FIGS. 2 and 5, a support portion 5a having a surface normal to an axial direction of the boss 4a is provided at an intermediate portion of each of the spoke portion core plates 5 in such a manner as to upwardly protrude therefrom, and these support portions 5a are brought into abutment with bottom sides of abutment portions 54a from below for supporting the respective abutment portions 54a. As shown in FIGS. 3, 5, 9 and 11, formed on left- and right-hand sides of the core plate 2 are mounting seats 7 which each extend so as to connect the front side spoke portion core plates 5F and the cover portion 4b of the boss portion core plate 4. Each mounting seat 7 constitutes a connecting portion to the air bag device M, and is integrally formed with the cover portion 4b and the spoke portion core plates. Each mounting seat 7 is constituted by a main body portion 8 extending rearward from the corresponding spoke portion core plate 5F and a support piece 28 connected to the cover portion 4b at the rear end of the main body portion 8.

An upwardly depressed accommodating portion 9 is formed in a lower side of each of the main body portions 8. The left and right mounting seats 7, connecting levers 18 and springs 24 are disposed horizontally symmetrically with respect to the boss portion B. The connecting levers 18 and springs 24 will be described further later on. Disposed in each of the depressed accommodating portions 9 are the connecting lever 18 for locking a connecting pin 65 provided on the air bag device M side when the air bag device M is mounted and the torsion coil spring 24. The connecting pin 65 will be described further later on.

Figure 9:
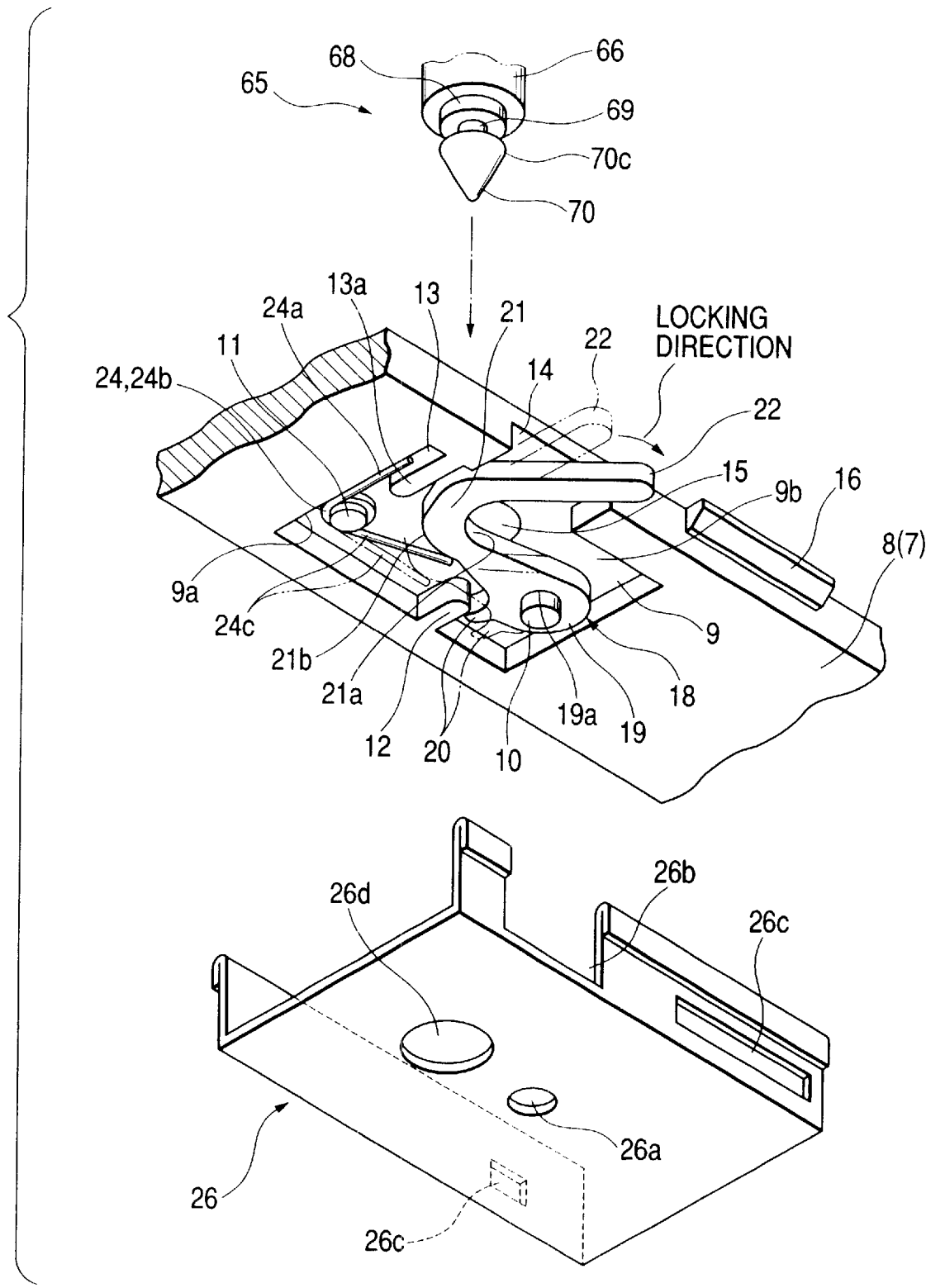
FIG. 9 is an exploded perspective view of a connecting pin and a connecting lever as viewed from below.
Figure 10:
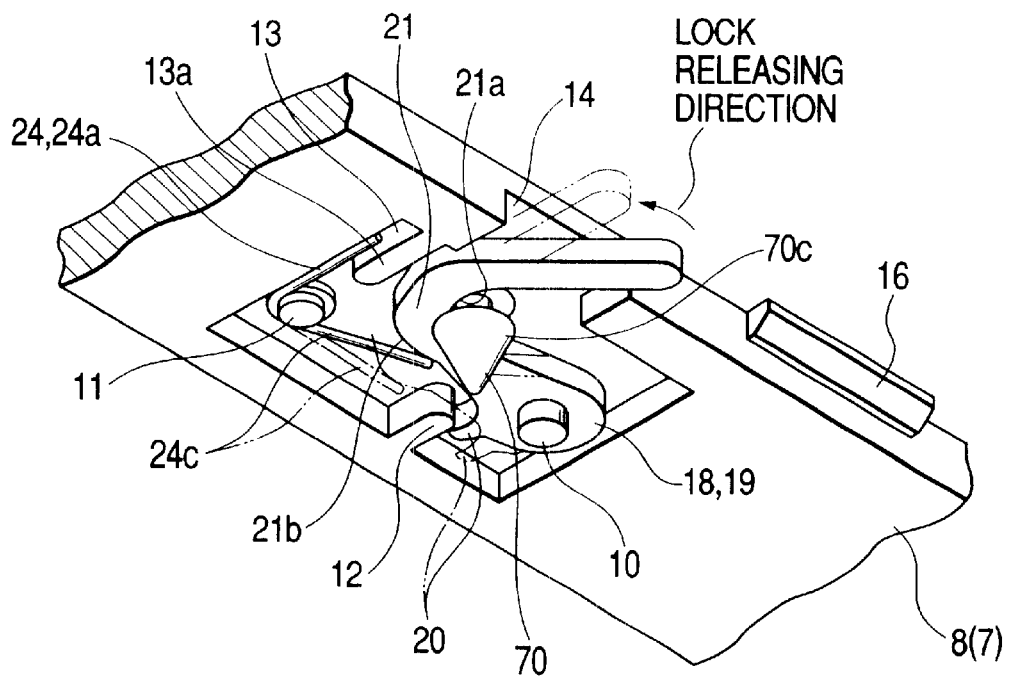
FIG. 10 is a perspective view, as viewed from below, of a state in which the connecting pin and the connecting lever both according to the embodiment are connected with each other.

As shown in FIGS. 9 and 10, disposed in each of the depressed accommodating portions 9 are a support shaft 10 for rotatably supporting the connecting lever 18, a support shaft 11 for supporting the spring 24, a restriction projection 12 for regulating a waiting position for the connecting lever 18 and a retaining seat 13 for retaining an end portion 24a of the spring 24. Each support shaft 10 is formed into a cylinder, and disposed so as to extend downward from a frontward position on a ceiling surface 9b of the depressed accommodating portion 9. Each support shaft 11 is formed into a cylinder, and disposed so as to extend downward from a rearward position on the ceiling surface 9b of the depressed accommodating portion 9. Each restriction projection 12 is disposed so as to extend outward in lateral directions from a boss portion core plate 4 side of an inner circumferential surface 9a of the depressed accommodating portion 9, so that a frontward face thereof can be brought into abutment with a restriction projection 20 of the connecting lever 18. Each retaining seat 13 is provided between a rearward surface of the inner circumferential surface 9a of the depressed accommodating portion 9 and a projection 13a, which is disposed so as to extend inward from an outward surface of the inner circumferential surface 9a of the depressed accommodating portion.

Additionally, an opening 14 communicating with the outside of the depressed accommodating portion 9 is formed in an outward position at the rear of each of the depressed accommodating portions 9. An operating portion 22 of the connecting lever 18, which will be described later, is allowed to project outwardly of each opening 14. Furthermore, locking projections 16 for mounting a cover 26, which will described later, on the main body portion 8 so as to cover the depressed accommodating portion 9 therebelow are formed on both left and right sides of each of the main body portions 8 at the front side thereof.

Additionally, a fitting hole 15 is formed in each main body portion 8 in the vicinity of the center thereof in such a manner as to communicate with the depressed accommodating portion 9 from an upper side of the main body portion 8. A large diameter portion 68 of the connecting pin 65, which will be described later, is allowed to fit in the fitting hole 15.

The connecting lever 18 which is accommodated in each depressed accommodating portion 9 is made of metal such as steel and, as shown in FIGS. 9 and 10, comprises a disk-like support portion 19 having formed therein a shaft hole 19a through which the support shaft 10 is inserted, a U-shaped hook portion 21 extending rearward from the support portion 19 and then extending outward and the operating portion 22 disposed at a distal end of the hook portion 21 so as to project outward from the opening 14 in the main body portion 8. The restriction projection 20 is provided on each support portion 19 in such a manner as to project therefrom to be brought into abutment with a front side of the restriction projection 12 on the main body portion 8. In addition, a curved inner circumferential surface side portion 21a of the hook portion 21 is formed so as not to cover the center O of the fitting hole 15 (refer to FIG. 11A) but to be exposed from the side of a boss portion core plate 4 of an inner circumference of the fitting hole 15 in a state that the restriction projection 20 is allowed to abut with the restriction projection 12.

A helical portion 24b of each of the torsion coil springs 24 is disposed around the support shaft 11 of the main body portion 8, and the end portion 24a thereof is fitted in the retaining seat 13, and the other end portion 24c is brought into abutment with a face 21b of the hook portion 21 on a boss portion core plate 4 side thereof, so that the hook portion 21 of each connecting lever 18 is biased so as to rotate outward (in a locking direction). In this connection, the restriction projection 20 of each connecting lever 18 is brought into abutment with the restriction projection 12 of the main body portion 8 by the biasing force of the spring 24, whereby the hook portion 21 is located at a waiting position where the rotation of the connecting lever 18 is restricted, and in this state, the curved inner circumferential side portion 21a of the hook portion 21 does not cover the center O of the fitting hole 15 and is exposed from the side of the boss portion core plate 4 of the inner circumference of the fitting hole 15.

As shown in FIG. 9, the cover 26 is formed of a sheet metal and has a U-shaped cross section so as to cover the depressed accommodating portion 9 from below. When mounted on the main body portion 8, the locking projections 16 of the main body portion 8 are inserted through locking holes 26c formed in left and right sides of the cover 26, whereby the cover 26 is locked on the main body portion 8. The cover 26 covers the depressed accommodating portion 9 and functions to prevent the connecting lever 18 and the spring 24 from falling from the depressed accommodating portion 9. Formed in each of the covers 26 which are provided on the left- and right-hand sides of the steering wheel main body 1 has a shaft hole 26a through which the support shaft 10 is allowed to project and an opening 26b located at a position corresponding to the opening 14 in the main body portion 8 for allowing the operating portion 22 of the connecting lever 18 to project therefrom. Moreover, a hole 26d is also opened in the cover 26 for allowing a locking portion 70, which will be described later, at a lower end of the connecting pin 65 to pass therethrough.

Figure 3:
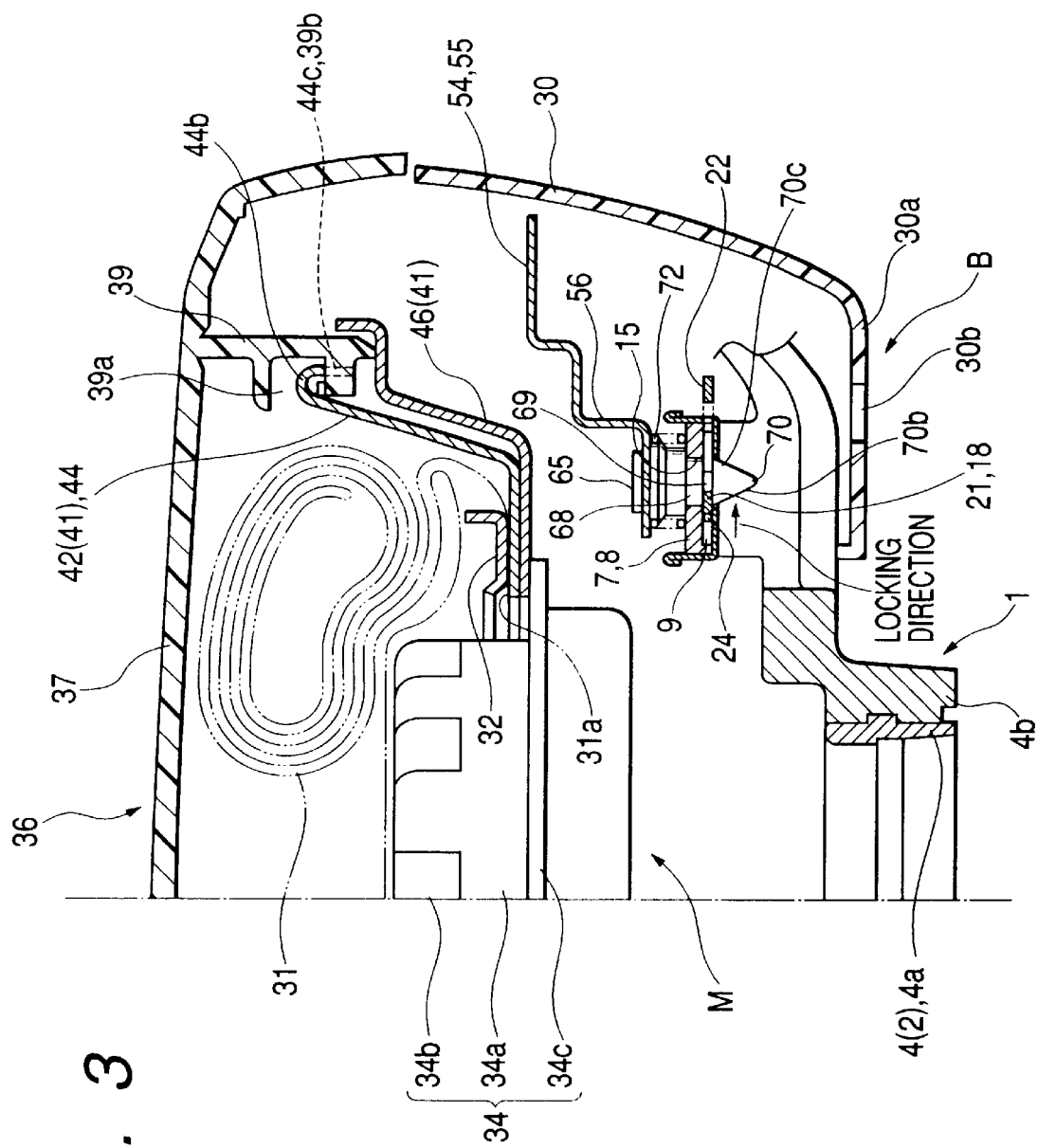
FIG. 3 is a vertical sectional view of the steering wheel according to the embodiment taken at a portion along the line III—III in FIG. 1.

In addition, as shown in FIGS. 1 to 5, the steering wheel main body 1 comprises a lower cover 30 of a synthetic resin which is screwed to the core plate 2 so as to cover the boss portion B from below. As shown in FIGS. 3 and 5, two operating holes 30b are formed in a bottom wall 30a of the lower cover 30. The respective operating holes 30b are disposed in the vicinity of positions below the operating portions 22 of the left and right connecting levers 18, and so as to be located off positions directly above an unillustrated column cover disposed below the steering wheel W when the steering wheel W is rotated so that the spoke portions S are disposed horizontally on each side.

Figure 4:
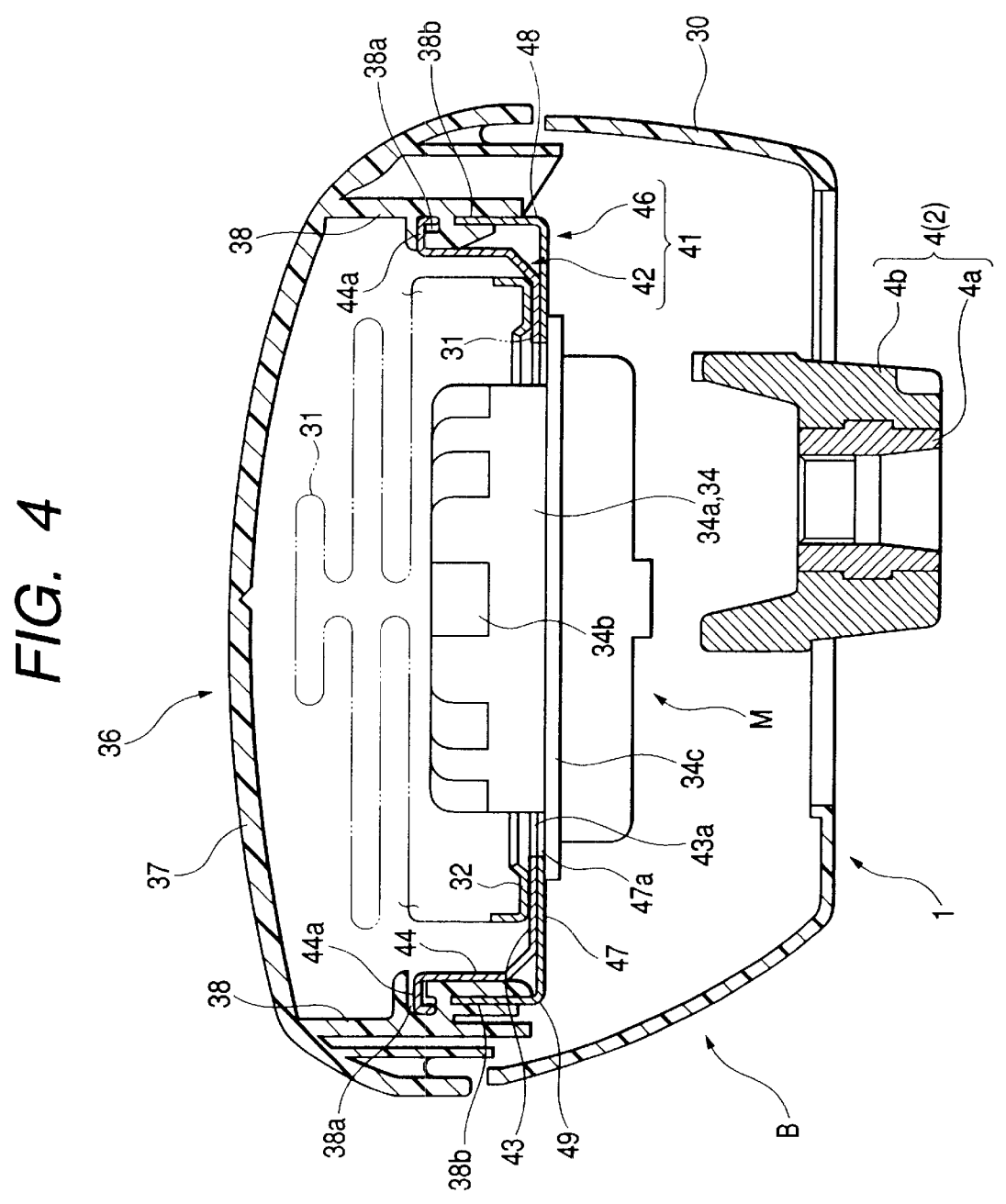

As shown in FIGS. 2 to 4, the airbag device M comprises a bag-like airbag 31 folded in an expandable fashion, an inflator 34 for supplying an expansion gas into the airbag 31, a pad 36 for covering the folded airbag 31, a bag holder 41 for holding the airbag 31 and the inflator 34, horn switches 53 and the connecting pins 65 for connecting the airbag device M to the steering wheel main body 1.

The inflator 34 comprises a substantially cylindrical main body portion 34a provided with gas discharge ports 34b at an upper portion thereof and a flange portion 34c projecting from an outer circumferential surface of the main body portion 34a.

As shown in FIGS. 1 to 4, the pad 36 is formed of a synthetic resin and comprises a ceiling wall portion 37 adapted to be broken at a predetermined position when the airbag 31 is expanded and four side wall portions 38, 38, 39, 39 extending downwardly from positions in the vicinity of an outer circumferential edge of the ceiling wall portion 37 in such a manner as to form a substantially square column.

As shown in FIG. 4, locking grooves 38a are formed in positions on inner circumferential sides of the respective side wall portions 38, 38 which face each other vertically for allowing locking hooks 44a on a holder plate 42, which will be described later, of the bag holder 41 to be inserted therein for locking, and insertion grooves 38b are formed in lower end faces of the side wall portions for allowing side wall portions 48, 49 of a back-up plate 46, which will be described later, of the bag holder 41 to be inserted therein.

As shown in FIG. 3, locking grooves 39a are formed in positions on inner circumferential sides of the respective side wall portions 39, 39 which face each other horizontally for allowing locking hooks 44b, which will be described later, on the holder plate 42 to be inserted therein for locking. In addition, locking holes 39b are formed in a circumferential surface on a lower side of the respective locking grooves 39a for allowing a plurality of projections 44c to be inserted therein for locking.

Moreover, a cylindrical presser rib 37a is formed on a lower surface of the ceiling wall portion 37 in the vicinity of an outer circumferential edge thereof so as to be brought into abutment with horizontal plate portions 50b, 51b of support pieces 50, 51, which will be described later, of the back-up plate 46.

the bag holder 41 comprises the holder plate 42 of a sheet metal and the back-up plate 46 of a sheet metal which is adapted to hold the pad 36 in cooperation with the holder plate 42.

As shown in FIGS. 2 to 4 and 6, the holder plate 42 comprises a substantially rectangular bottom wall portion 43 formed at the center thereof with a hole 43a through which the inflator main body portion 34a can be inserted from below and a side wall portion 44 which extends from an outer circumferential edge of the bottom wall portion 43 in such a manner as to form a substantially square column.

Through holes 43b are formed in positions around a circumferential edge of the through hole 43a in the bottom wall portion 43 for allowing unillustrated bolts of a retainer 32, which will be described later, to be inserted therethrough. The locking hooks 44a are formed respectively on vertical edges of the side wall portion 44 at an upper end thereof in such a manner as to be turned in a reverse direction, and the locking hooks 44b are formed respectively on lateral edges of the side wall portion 44 at the upper end thereof in such a manner as to be turned in a reverse direction, the plurality of projections 44c being formed at distal ends of the respective locking hooks 44b.

As shown in FIGS. 2 to 4 and 7, the back-up plate 46 comprises a substantially rectangular bottom wall portion 47 formed at the center thereof with a hole 47a through which the inflator main body portion 34a can be inserted therein from below and side wall portions 48, 49 which extend upward from vertical edges of the bottom wall portion 47. Through holes 47b are formed in positions around a circumferential edge of the through hole 47a in the bottom wall portion 47 for allowing unillustrated bolts of the retainer 32, which will be described later, to be inserted therethrough.

Furthermore, the support pieces 50 are formed in the vicinity of left- and right-side edges of the circumferential edge portion of the bottom wall portion 47 at the front thereof, and each of the support pieces 50 comprises a vertical plate portion 50a extending vertically in a stepped fashion and the horizontal plate portion 50b bent from an upper end of the vertical plate portion 50a so as to extend outward. In addition, the support pieces 51 are formed in the vicinity of left- and right-side edges of the circumferential edge portion of the bottom wall portion 47 at the rear thereof, and each of the support pieces 51 comprises a vertical plate portion 51a extending vertically from the bottom wall portion 47 and the horizontal plate portion 51b bent from an upper end of the vertical plate portion 51a so as to extend outward.

The horizontal plate portions 50b, 51b of the support pieces 50, 51 are to constitute movable plates 58, which will be described later, for the horn switches 53. In addition, a lead wire, not shown, is connected to the back-up plate 46 so that the back-up plate 46 is electrically connected to a positive electrode of a horn actuating circuit.

The annular retainer 32 disposed within the air bag 31 is used to hold the air bag 31 and the inflator 34 with the bag holder 41. The retainer 32 is provided with the four unillustrated bolts which extend downward, and the airbag 31 and the inflator 34 are allowed to be held by the bag holder 41 comprising the holder plate 42 and the back-up plate 46 by allowing the bolts to pass through unillustrated through holes in a circumferential edge around an opening 31a in the airbag 31, the through holes 43b in the holder plate 42, the through holes 47b in the back-up plate 46 and unillustrated through holes in the flange portion 34c of the inflator 34 for being secured with nuts, respectively.

In holding the pad 36 with the holder plate 42 and the back-up plate 46, the respective locking hooks 44a, 44b are inserted in the locking grooves 38a, 39a in the respective side wall portions 38, 39 of the pad 36 for locking therein, and furthermore, the side wall portions 48, 49 of the back-up plate 46 are inserted in the insertion grooves 38b, 38b in the vertical side wall portions 38, 38 of the pad 36 so that the side wall portions 39, 39 of the pad are locked with the locking hooks 44b of the bag holder 41, the side wall portions 38, 38 of the pad are held with the locking hooks 44a, 44a of the holder plate 42 and the side wall portions 48, 49 of the back-up plate 46, thus the bad 36 being held with the bag holder 41.

Note that when the hook portions 44b of the holder plate 42 are inserted in the locking grooves 39a for locking therein, the respective projections 44c are inserted in the locking holes 39b in the respective side wall portions 39.

As shown in FIGS. 1 and 2, the horn switches 53 are disposed at four positions in total which are located on the left and right sides of the steering wheel W such that the switches are located at positions in the vicinity of the cover layer 6 on the respective spoke portions S on the back side of the pad ceiling wall portion 37. The horn switches 53 each comprise a stationary contact 57 adapted to be brought into abutment with a stationary plate 54 therebelow for establishing an electric conduction therewith, a movable contact 59 disposed above the stationary contact 57 and adapted to be brought into abutment with a movable plate 58 for establishing an electric conduction therewith, a coil spring 60, insulators 61, 62 and a shouldered bolt 63.

Note that in this embodiment, the stationary plate 54 is disposed so as to extend vertically on the left and right sides of the steering wheel W so that the stationary plate 54 is shared by the horn switches 53, 53 arranged vertically on the respective sides of the steering wheel W. In addition, the stationary plate 54 is electrically connected with the steering wheel core plate 2 which constitutes a negative electrode of the horn actuating circuit via the secured connecting pin 65.

A nut 58a is welded to an upper side of the movable plate 58, and the movable contact 59 is pressed by the shouldered bolt 63 at a large diameter portion 63a thereof when the bolt 63 is passed from below through the contacts 57, 59, the coil spring 60, the insulators 61, 62 and the movable plate 58 so as to be screwed with the nut 58a, whereby the movable contact 59 is secured to the movable plate 58. The stationary contact 57 is secured to the insulator 61 which is bayonet connected to the stationary plate 54. The coil spring 60 is disposed around the stationary and movable contacts 57, 59 to bias the movable contact 59 so that the movable contact 59 moves away from the stationary contact 57. Although the coil spring 60 is brought into abutment with the stationary plate 54 at a lower end thereof, the coil spring 60 is insulated with the insulator 62 and biases the movable plate 58 upwardly. The distance over which the movable contact 59 moves away from the stationary contact 57 is restricted when the shouldered bolt 63 which is in abutment with the stationary plate 54 at a collar portion thereof via a flange portion (a reference numeral is omitted in the figure) at a lower end of the insulator 61 is screwed by the nut 58a.

Figure 8:
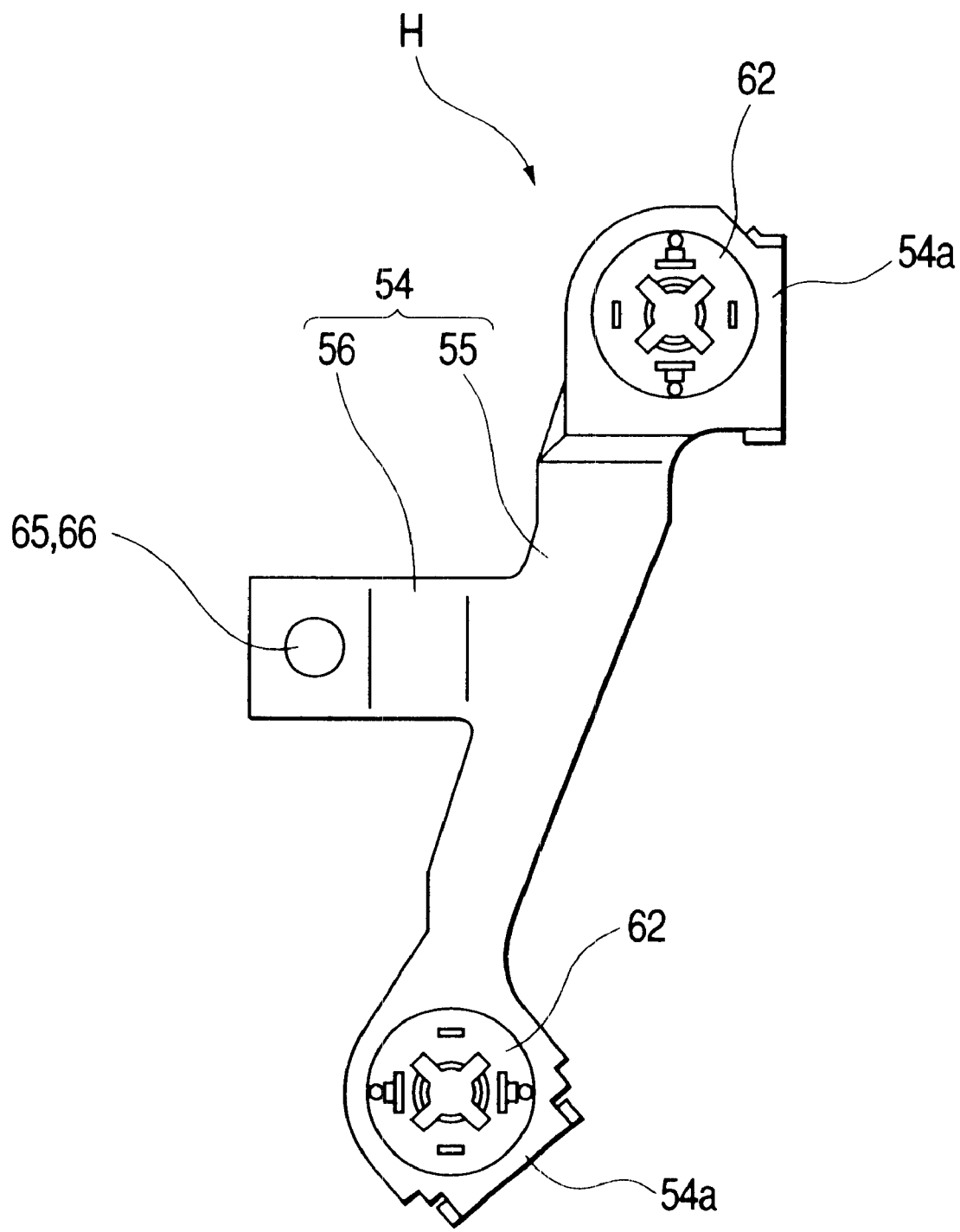
FIG. 8 is a plan view of a horn switch assembly for use in the air bag device according to the embodiment.

In this embodiment, the stationary and movable contacts 57, 59, the coil spring 60 and the insulators 61, 62 are temporarily assembled together in advance for construction of a switch main body by using engagement portions, not shown, of the respective insulators 61, 62 and a locking portion, not shown, for locking the coil spring 60 of the insulator 62, and the respective switch main bodies are constructed so as to be assembled to the stationary plate 54 by bayonet connecting the insulator 61 to the stationary plate 54. Then, the respective switch main bodies are assembled to the stationary plate 54 so as to form a horn switch assembly H (refer to FIG. 8), and the horn switch assembly H is then assembled to the back-up plate 46 which is on the movable plate 58 side by using the shouldered bolt 63.

The stationary plates 54 disposed on the left and right sides of the steering wheel are formed symmetrically in a horizontal direction, and are, as shown in FIGS. 1 to 3 and 8, formed of a sheet metal. The stationary plate 54 comprises a base portion 55 disposed to extend substantially in a longitudinal direction of the steering wheel W and a mounting piece 56 extending from an inner edge of the base portion 55 at substantially a vertically intermediate portion thereof toward the boss portion core plate 4 side via a step provided so as to be lowered therefrom.

Figure 11:
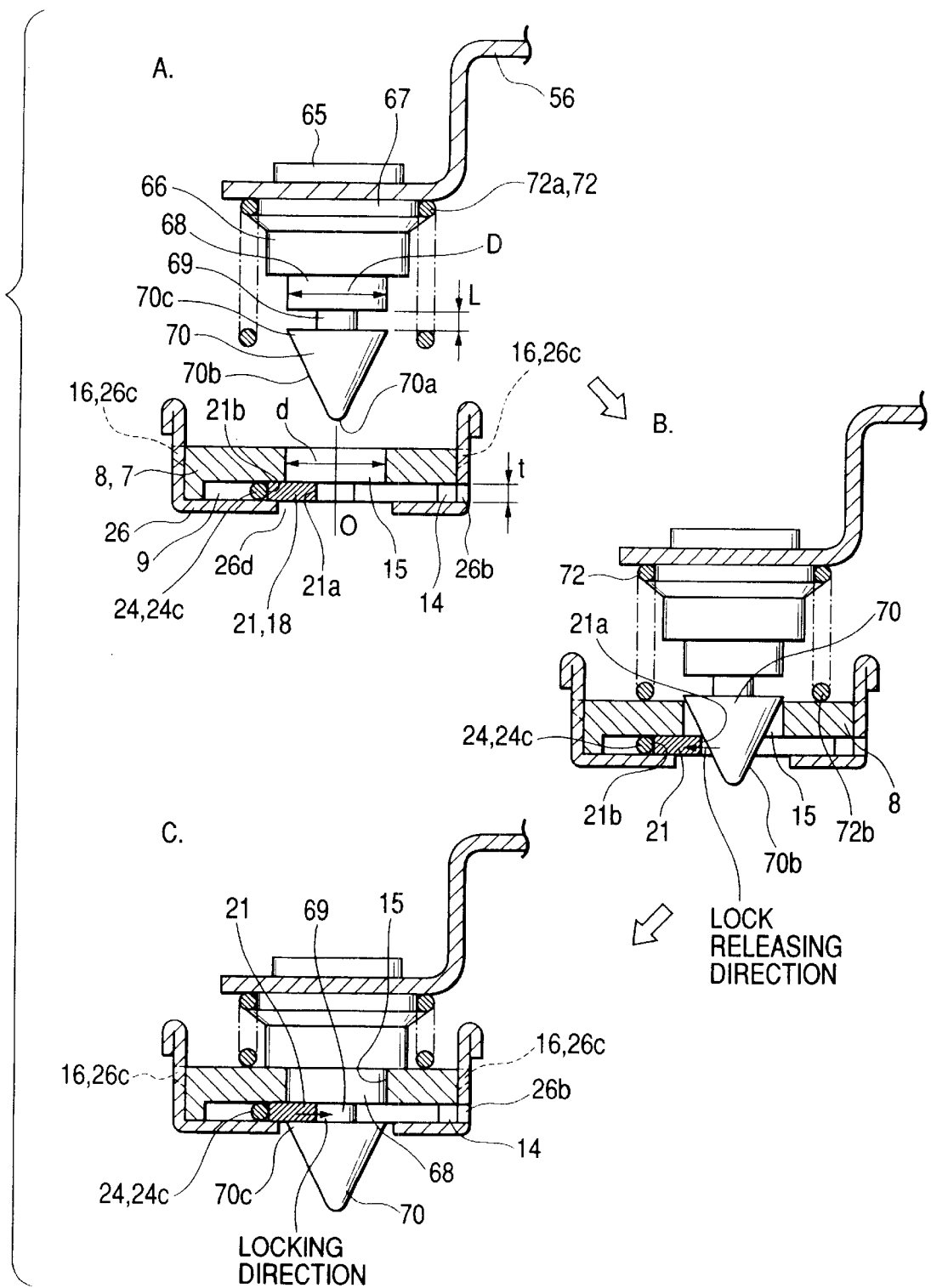
FIG. 11 is sectional views showing states in which the connecting pin and the connecting lever both according to the embodiment come to be connected with each other.

Secured to a distal portion of each mounting piece 56 is the connecting pin 65 which projects downward for connecting the air bag device M to the steering wheel main body 1. Each connecting pin 65 is made of a metal such as a steel bar and comprises, as shown in FIG. 11, a conical locking portion 70 disposed at a lower distal end thereof and provided with a tapered and inclined guide surface 70b, a cylindrical small diameter portion 69 disposed at a proximal end of the locking portion 70 and having a diameter smaller than that of the locking portion 70 and the large diameter portion 68 disposed on a proximal end of the small diameter portion 69 and having a diameter substantially equal to the outside diameter of the locking portion 70. Formed on a proximal end of the large diameter portion 68 is a cylindrical base portion 66 which is pressed so as to be secured to the mounting piece 56 and has an outside diameter larger than that of the large diameter portion 68. A locking pawl portion 67 is formed on an outer circumferential surface of the base portion 66 for locking an upper end 72a of a coil spring 72.

The coil spring 72 is brought into abutment with a circumferential edge of the fitting hole 15 in the upper side of the mounting seat main body portion 8 at a lower end 72b thereof and functions to bias the connecting pin 65 along the axial direction of the connecting pin and in a direction in which the connecting pin 65 moves away from the hook portion 21. In addition, the natural length of each coil spring 72 when no load is applied thereto is set to a length over which a distal end center portion 70a of the locking portion 70 projects from the lower end 72b thereof so that the distal end center portion 70a of the locking portion 70 of the connecting pin 65 can be inserted into the fitting hole 15 accurately with the upper end 72a being locked by the locking pawl portion 67. In this embodiment, it is constructed such that the lower end 72b of the spring 72 is disposed at a position 5 mm or more above the distal end center portion 70a of the locking portion 70. Furthermore, the total biasing force of the left- and right-hand side springs 72 with the locking portions 70 being locked by the hook portions 21 and the lower ends 72 being brought into abutment with the circumferential edge of the fitting hole 15 is set to a biasing force which is greater than the total biasing force of the coil springs 60 of the horn switches 53 and which can strongly push upward the air bag device M when the hook portions 21 are released from the locked states. In this embodiment, with the locking portions 70 being locked by the hook portions 21, the air bag device M is biased upward with a force of 1ON or more. However, in the event that the biasing force is too large, the connecting pin 65 cannot be forced in the side where the connecting levers 18 are provided. Therefore it is desirable to determine that the spring rates of the respective springs 72 are in the order of 60 N/cm or lower.

Then, the length L of the small diameter portion 69 of the connecting pin 65 in the axial direction is set substantially equal to a thickness t of the inner circumferential surface side portion 21a of the hook portion 21 of the connecting lever 18, and the outside diameter D of the large diameter portion 68 is set substantially equal to the inside diameter of the fitting hole 15.

In addition, each connecting pin 65 is disposed at such positions against the air bag device M that the respective connecting pins 65 can be fitted in the fitting holes 15 on the mounting seats 7 respectively when the air bag device M is mounted on the steering wheel main body and at such heights that the hook portions 21 of the connecting levers 18 can be inserted into the small diameter portions 69 of the connecting pins 65 when the abutment portions 54a of the respective stationary plates 54 are brought into abutment with the support portions 5a of the respective spoke portion core plates 5 for support thereon.

Described next will be operations of assembling the air bag device M and mounting the air bag device on the steering wheel main body 1. First, when the air bag device M is assembled, the retainer 32 is inserted into the air bag 31 through the opening 31a, and the unillustrated bolts, of the retainer 32 are then caused to project from the circumferential edge portion of the opening 31a. Following this, the air bag 31 is folded down.

Thereafter, the folded air bag 31 is fitted in the holder plate 42 of the bag holder 41 such that the respective bolts of the retainer 32 are allowed to project from the through holes 43b, and furthermore, the pad 36 is fitted thereover from above the airbag 31, the respective locking hooks 44a, 44b of the holder plate 42 being inserted in the locking grooves 38a, 39a in the respective side wall portions 38, 38, 39, 39 of the pad 36 for locking therein.

Then, the back-up plate 46 is fitted over from below the holder plate 42 so that the respective bolts of the retainer 32 are allowed to project from the through holes 47b, and the side wall portions 48, 49 are inserted into the insertion grooves 38b in the vertically arranged side wall portions 38, 38 of the pad 36. Furthermore, the inflator main body portion 34a is inserted into the holes 47a, 43a in the back-up plate 46 and the holder plate 42 from below such that the respective bolts of the retainer 32 are allowed to project from the flange portion 34c, and the nuts are screwed on the respective bolts of the retainer 32, whereby the airbag 31, the inflator 34 and the pad 36 can be held on the bag holder 41.

Thereafter, the horn switch assemblies H are installed to the respective movable plates 58 on the back-up plate 46. In other words, a portion of the insulator 62 where the insulator 62 is installed to the stationary plate 54 is disposed below the nut 58a on each movable plate 58, and the shouldered bolt 63 is screwed into the nut 58a from below the stationary plate 54, whereby the airbag device M can be assembled which has the horn switches 53 disposed thereon.

Then, when the airbag device M so assembled is mounted on the steering wheel main body 1, the respective connecting pins 65 are disposed above the corresponding fitting holes 15, and the airbag device M is forced down such that the respective connecting pins 65 are forced into the fitting holes 15. Note that before mounting the airbag device M on the steering wheel main body, the steering wheel main body 1 has been mounted on the steering shaft of an automotive vehicle, the unillustrated lead wire connected to the back-up plate having been connected to a predetermined connector which is electrically connected to the positive electrode of the horn actuating circuit, and the unillustrated lead wire extending from the inflator 34 having been connected to a predetermined connector electrically connected to the same inflator actuating circuit.

Then, when the respective connecting pins 65 are forced into the fitting holes 15, at the respective mounting seats 7 on the steering main body 1 side, by the biasing force of the torsion coil springs 24 and through the abutment of the restriction projections 20 against the restriction projections 12, the curved inner circumferential surface side portion 21a of the hook portions 21 are located so as not to cover the centers O of the respective fitting holes 15 and are exposed from the boss portion core plate 4 sides of the inner circumferential sides of the respective fitting holes 15. As a result, the respective connecting pins 65 are allowed to be forced into the fitting holes 15 such that the distal end center portions 70a of the locking portions coincide with the centers O of the fitting holes 15. Namely, the hook portions 21 of the respective connecting levers 18 interfere with the guide surfaces 70b of the connecting pins 65 which are being forced in along the axial direction thereof, whereby the hook portions 21 are located at the waiting positions where they can rotate in the lock releasing direction. Consequently, according to the construction, as the connecting pins 65 are forced in, as shown in FIGS. 11A, 11B, 11C, the hook portions 21 rotate in the lock releasing direction as being guided along the guide surfaces 70b, and when the small diameter portions 69 of the connecting pins 65 come to be disposed at the positions of the hook portions 21, the hook portions 21 are inserted into the small diameter portions 69 by the biasing force of the torsion coil springs 24, whereby the proximal portions 70c of the locking portions 70 are locked such that the connecting pins 65 cannot be dislocated. As a result, the airbag device M can be mounted on the steering wheel main body 1 side.

In other words, when the airbag device M is mounted on the steering wheel main body 1, the airbag device M can be mounted on the steering wheel main body 1 by simply forcing the connecting pins 65 into the hook portions 21 of the connecting levers 18.

In the steering wheel W assembled as described above, when the airbag device M is depressed by depressing the pad 36, the movable plates 58 approach the stationary plates 54 against the biasing force of the coil springs 60, whereby the movable contacts 59 are brought into contact with the stationary contacts 57, the horn being thereby actuated.

Additionally, when an expansion gas is allowed to be discharged from the gas discharge ports 34b of the inflator 34, the airbag 31 breaks the ceiling wall portion 37 of the pad 36 and expands and deploys largely. When this occurs, upward and downward tensile forces of a large magnitude act on the bag holder 41 of the airbag device M. However, even if the bag holder 41 is strongly pulled upward, since the connecting pins 65 connected to the bag holder 41 via the shouldered bolts 63 and the stationary plates 54 are locked to the circumferential edges of the inner circumferential surface side portions 21a of the hook portions 21 of the connecting levers disposed on the steering wheel main body side 1 at the proximal portions 70c of the locking portions 70 thereof, the movement of the bag holder 41 is prevented. Additionally, even if the bag holder 41 is strongly depressed, since the abutment portions 54a of the respective stationary plates 54 are supported on the support portions 5a of the spoke portion core plates 5 and since the lower end faces of the base portions 66 of the respective connecting pins 65 are in abutment with the circumferential edges of the fitting holes 15, the movement of the bag holder 41 is prevented.

On the other hand, when the airbag device M is removed from the steering wheel main body 1 for maintenance and so on, the steering wheel W is operated to rotate such that the spoke portions S horizontally arranged with two spoke portions being disposed on each side of the steering wheel W are oriented vertically. Thus, the respective operating holes 30b are come off the positions directly above the unillustrated column cover disposed below the steering wheel W. Following this, a tool such as a pin is inserted into the lower cover 30 through each operating hole 30b so as to hook on to the operating portion 22 of the connecting lever 18, and the connecting lever 18 is then operated to rotate in the lock releasing direction in which the hook portion 21 is released from the locked state, and furthermore, the airbag device M is then moved upward such that the respective connecting pins 65 are dislocated from the hook portions 21, whereby the airbag device M can be removed from the steering wheel main body 1 in a simple fashion.

Consequently, with the steering wheel W according to the embodiment of the invention, the operating holes 30b for implementing the lock releasing operation of the connecting levers 18 are provided in the bottom wall 30a of the lower cover 30, and therefore, the deterioration in external appearance of the steering wheel W can be suppressed. Additionally, as has been described above, the airbag device M can be mounted on and dismounted from the steering wheel main body 1 in a simple fashion.

In addition, with the steering wheel W according to the embodiment of the invention, the large diameter portion 68 is provided at the proximal end of the connecting pin 65 wherein the large diameter portion has an larger outside diameter than the outside diameter of the locking portion 70, and the fitting holes 15 are disposed in the mounting seat 7 provided on the side where the connecting lever 18 is disposed for allowing the large diameter portion 68 to fit therein when the proximal portion 70c of the locking portion 70 is locked by the hook portion 21. Due to this construction, when the airbag device M is mounted on the steering wheel main body 1 (the proximal portion 70c of the locking portion 70 is locked by the hook portion 21 of the connecting lever 18), since the large diameter portion of the connecting pin 65 fits in the fitting hole 15 so as to restrict the movement of the connecting pin 65 in the direction normal to the axial direction thereof, the loosening of the connecting pin 65 in substantially horizontal directions which are normal to the axial direction thereof in the airbag device M can be prevented.

In addition, in this embodiment, while the outside diameter of the locking portion 70 is set as substantially equal to the outside diameter D of the large diameter portion 68, in view of the insertion of the large diameter portion 68 into the fitting hole 15, the outside diameter of the locking portion 70 may be equal to or smaller than the large diameter portion 68, or the outside diameter D of the large diameter portion 68 may be equal to or larger than the outside diameter of the locking portion 70.

Furthermore, in the embodiment according to the invention, disposed on the side of the airbag device M where the connecting pins 65 are disposed are the springs 72 which are adapted to be in abutment with the circumferential edges of the fitting holes 15 formed in the upper sides of the main body portions 8 which are on the side where the connecting levers 18 are disposed and to bias the connecting pins 65 along the axial direction thereof and upward such that the connecting pins 65 move away from the hook portions 21.

Due to the construction, when the proximal portions 70c of the locking portions 70 of the connecting pins are locked by the hook portions 21 of the connecting levers 18, the connecting pins 65 are biased by the biasing force of the springs 72 along the axial direction thereof and in the direction in which the connecting pins 65 move away from the hook portions 21, whereby the hook portions 21 of the connecting levers are brought into a more secure abutment with the proximal portions 70c of the locking portions 70 of the connecting pins 65. Due to this more secure abutment, the movement of the connecting pins 65 in the upward direction in which they move away from the hook portions 21 is restricted through the locking of the hook portions 21 at the proximal portions 70c of the locking portions 70, and on the contrary, the movement of the connecting pins 65 in the direction in which they are forced into the hook portions 21 or the downward movement of the connecting pins 65 are restricted by the strong biasing force of the springs 72. As a result, when the airbag device M is mounted on the steering wheel main body 1, since the vertical movements of the connecting pins 65 along the axial directions thereof are thus restricted, the vertical loosening of the connecting pins 65 along the axial directions thereof in the airbag device M can be thus prevented.

Additionally, when the airbag device M is mounted on the steering wheel main body 1 (when the proximal portions 70c of the locking portions 70 are locked by the hook portions 21 of the connecting levers 18), since the connecting pins 65 are biased along the axial direction thereof and in the upward direction in which the connecting pins move away from the hook portions 21, when the tool hooks on to the operating portions 22 so as to rotate the connecting lever 18 so that the locking of the proximal portion 70c of the locking portion 70 by the hook portion 21 is released, the connecting pin 65 is easily allowed to move away from the hook portion 21 to thereby be dislocated from the fitting hole 15. Thereafter, even if the tool is removed from the hook portion 21 so as to allow the connecting lever 18 to be restored to the state before the insertion of the connecting pin 65 thereinto, the locking portion 70 of the connecting pin 65 is dislocated from the hook portion 21 to be pulled out of the fitting hole 15, and therefore, the airbag device M can easily be dismounted from the steering wheel main body 1 without a risk of the connecting pins 65 interfering with the mounting seats 7.

Note that while the connecting levers 18 are described as being disposed on the steering wheel main body 1 side, whereas the connecting pins 65 are described as being disposed on the airbag device M side in the embodiment described heretofore, they may be disposed the other way round, i.e., the connecting levers 18 may be disposed on the airbag device M side, whereas the connecting pins 65 may be disposed on the steering wheel main body 1 side.

Additionally, while the bag holder 41 on the airbag device M side is described as comprising the holder plate 42 and the back-up plate 46 in the embodiment described heretofore, in a case where the respective side wall portions 38, 39 of the pad 36 are constructed so as to be riveted, the bag holder may be constituted only by the back-up plate 46.

What is claimed is:

1. A steering wheel with an airbag device, comprising:
    a steering wheel main body;
    an airbag device;
    a connecting pin provided on said airbag device and protruding toward the steering wheel main body, said connecting pin comprising:
        a locking portion disposed at a first end of said pin and having a tapered and inclined guide surface, and
        a small diameter portion disposed at a second end of said pin and having a smaller diameter than a first end of said locking portion; and
    a pivotally mounted curved connecting part provided on the steering wheel main body, rotating in a direction substantially normal to an axial direction of said connecting pin, said connecting part comprising:
        a hook portion adapted to be inserted in said small diameter portion of said locking pin for locking a first portion of said locking portion and biased in a locking direction, and an operating portion for operating said hook portion so as to rotate in a lock releasing direction; wherein, said airbag device is mounted on said steering wheel main body in such a manner that said hook portion interferes, when connected, with said guide surface of said connecting pin of the airbag device when the airbag device is forced in the axial direction of said connecting pin so as to be located at a waiting position where said hook portion is allowed to rotate in the lock releasing direction.

2. A steering wheel with an airbag device according to claim 1, wherein said connecting pin comprises further a large diameter portion having a larger outside diameter than the outside diameter of said locking portion at the first end of the locking portion, and wherein, a fitting hole is disposed in said steering wheel main body where said connecting part is disposed, and said fitting hole allows said large diameter portion to fit therein when said first portion of said locking portion is locked by said hook portion.

3. A steering wheel with an airbag device according to claim 1, wherein a spring is disposed on said airbag device where said connecting pin is disposed, and said spring is adapted to be brought into abutment with said steering wheel main body where said connecting part is disposed and to bias said connecting pin respectively along the axial direction of said connecting pin and in a direction in which said connecting pin moves away from said hook portion.

4. A steering wheel with an airbag device according to claim 1, wherein a plurality of said connecting pins are provided on said airbag device and protrude toward the steering wheel main body, and a plurality of said connecting parts rotating in the direction substantially normal to the axial direction of said connecting pins are provided on the steering wheel main body.

5. A steering wheel with an airbag device according to claim 1, further comprising a main body portion formed on said steering wheel main body, wherein said connecting part is accommodated in a depressed accommodating portion of said main body portion and said operating portion of said connecting part is extended outward from an opening formed on said main body portion.

6. A steering wheel with an airbag device, comprising:

a steering wheel main body including a boss portion, a ring portion and a plurality of spoke portions;

an airbag device;

a connecting pin provided on said airbag device and protruding toward the steering wheel main body, said connecting pin comprising:

a locking portion disposed at a first end of said pin, and an engaging portion disposed at a first end of said locking portion; and a pivotally mounted connecting part provided on the steering wheel main body, rotating in a direction substantially normal to an axial direction of said connecting pin, said connecting part comprising:

an engaged portion adapted to be inserted in said engaging portion of said locking pin for locking a first portion of said locking portion and biased in a locking direction, a stationary plate provided on said airbag device, comprising a plurality of abutment portions brought into abutment with the spoke portions;

a base portion supporting the airbag device through a spring and connecting the abutment portions, and a mounting piece located nearer to the boss portion than the base portion and extending from the base portion, the mounting piece retaining said connecting.

7. A steering wheel with an airbag device according to claim 6, wherein the spring urges the stationary plate and the airbag device so as to form a gap there between and a horn switch is provided in the gap.

8. A steering wheel with an airbag device according to claim 6, wherein the base portion is provided nearer to the boss portion than the abutment portion.

* * * * *